United States Patent
Ramaswamy et al.

(10) Patent No.: US 12,200,536 B2
(45) Date of Patent: Jan. 14, 2025

(54) SYSTEMS AND METHODS FOR IDENTIFYING AND CORRECTING ISSUES ASSOCIATED WITH A WIRELESS NETWORK

(71) Applicant: Verizon Patent and Licensing Inc., Basking Ridge, NJ (US)

(72) Inventors: Karthik Ramaswamy, Coppell, TX (US); Stephen C. Opferman, Denver, CO (US); John F. Moore, Roanoke, TX (US); Michael T. D'Agostino, Newton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 17/663,054

(22) Filed: May 12, 2022

(65) Prior Publication Data

US 2023/0370892 A1 Nov. 16, 2023

(51) Int. Cl.
*H04W 28/02* (2009.01)
*H04W 76/28* (2018.01)

(52) U.S. Cl.
CPC ... *H04W 28/0273* (2013.01); *H04W 28/0242* (2013.01); *H04W 28/0268* (2013.01); *H04W 76/28* (2018.02)

(58) Field of Classification Search
CPC ............ H04W 76/28; H04W 28/0236; H04W 28/0268; H04W 28/0273; H04W 28/0242
See application file for complete search history.

(56) References Cited

U.S. PATENT DOCUMENTS

| | | | |
|---|---|---|---|
| 2021/0409992 A1* | 12/2021 | Arshad | H04W 76/27 |
| 2022/0014963 A1* | 1/2022 | Yeh | G06N 7/01 |
| 2022/0295343 A1* | 9/2022 | Pefkianakis | H04W 28/0289 |
| 2023/0084999 A1* | 3/2023 | Selvanesan | H04W 72/02 370/329 |
| 2023/0199669 A1* | 6/2023 | Vannithamby | H04W 52/365 455/127.1 |
| 2023/0412513 A1* | 12/2023 | Jin | H04L 41/5054 |
| 2024/0015845 A1* | 1/2024 | Mohammad Soleymani | H04W 74/0808 |
| 2024/0236183 A1* | 7/2024 | Bangolae | H04W 28/0284 |

FOREIGN PATENT DOCUMENTS

WO WO-2022150156 A1 * 7/2022
WO WO-2024063590 A1 * 3/2024

* cited by examiner

*Primary Examiner* — Mehmood B. Khan

(57) ABSTRACT

A device may receive network data identifying an SINR, an RSSI, congestion, and throughput associated with a RAN, device data identifying latency and packet loss associated with the RAN, and an issue inference confidence score associated with a machine learning model. The device may process the network data, the device data, and the issue inference confidence score, with a model, to determine one or more issues. The device may adjust TTI bundling to generate adjusted TTI bundling, may lower a QCI or a QFI and adjust associated parameters to generate QCI/QFI adjusted parameters, may adjust slice parameters to generate adjusted slice parameters, or may adjust DRX parameters to generate adjusted DRX parameters based on the one or more issues with the RAN. The device may cause the adjusted TTI bundling, the QCI/QFI adjusted parameters, the adjusted slice parameters, or the adjusted DRX parameters to be implemented by the RAN.

20 Claims, 10 Drawing Sheets

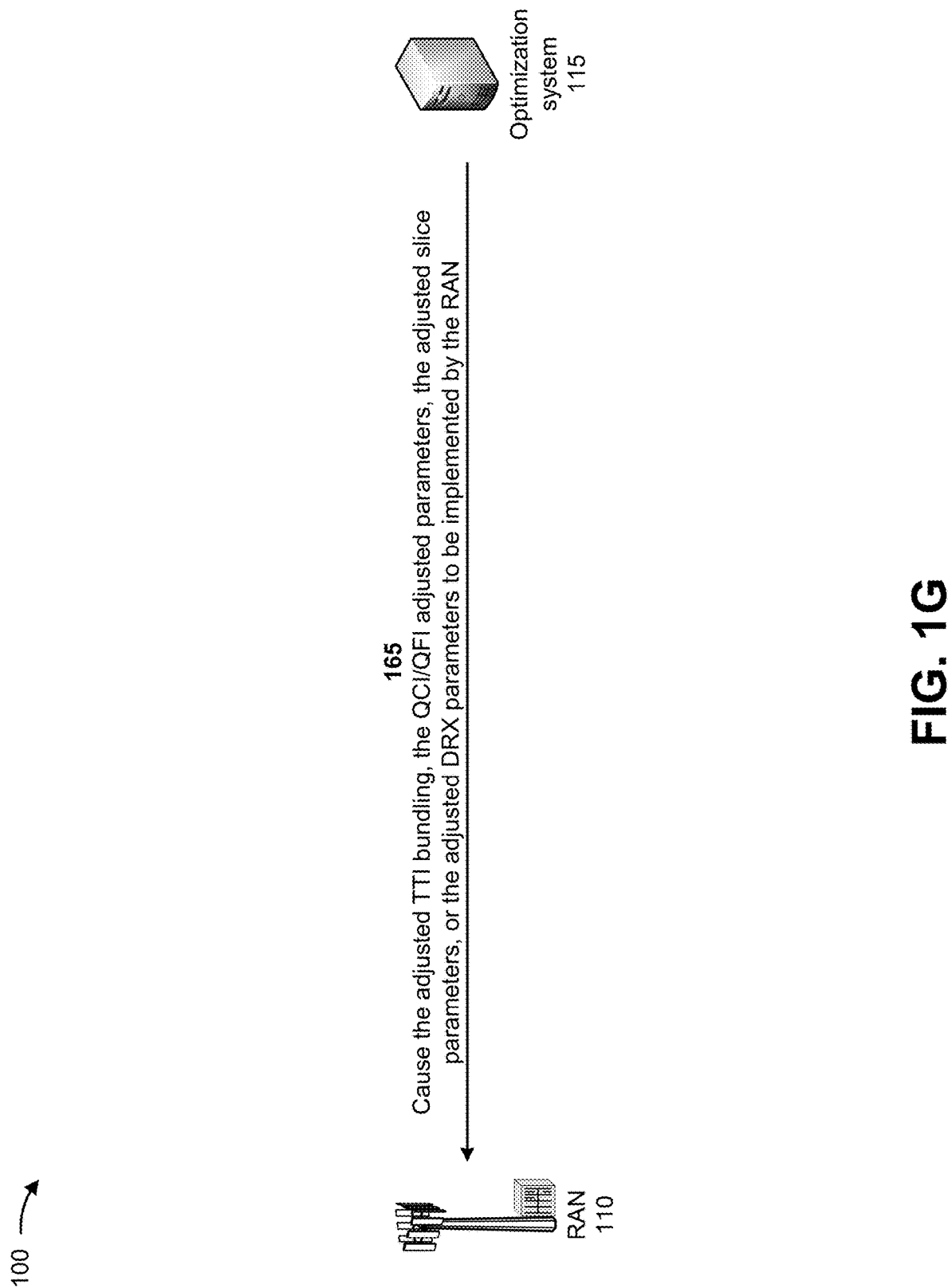

SYSTEMS AND METHODS FOR IDENTIFYING AND CORRECTING ISSUES ASSOCIATED WITH A WIRELESS NETWORK

BACKGROUND

A user equipment (UE) may utilize a wireless network (e.g., a radio access network (RAN)) to attach to a core fourth-generation (4G) network or a core fifth-generation (5G) network.

BRIEF DESCRIPTION OF THE DRAWINGS

FIGS. 1A-1G are diagrams of an example associated with identifying and correcting issues associated with a wireless network.

DETAILED DESCRIPTION OF EXAMPLE EMBODIMENTS

Figure 1A:
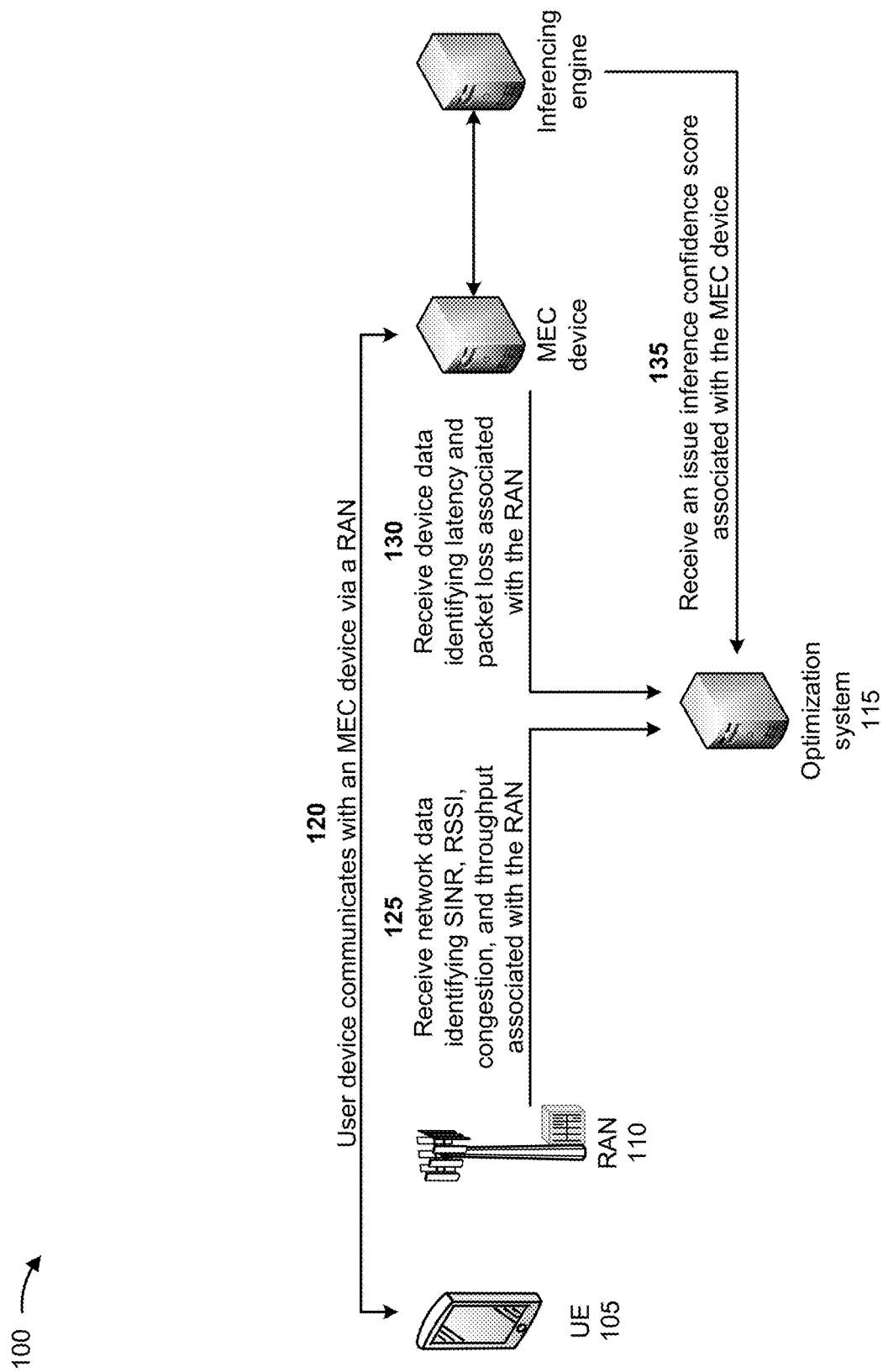

The following detailed description of example implementations refers to the accompanying drawings. The same reference numbers in different drawings may identify the same or similar elements.

A UE may utilize a RAN to transmit traffic to other UEs or other devices (e.g., multi-access edge computing (MEC) devices) and/or to receive traffic from the other UEs or the other devices. For example, in an edge use case, an MEC device may stream data (e.g., video data) to a UE via the RAN. In another example, a UE (e.g., a video camera) may transmit high throughput data (e.g., video data) through the RAN to another UE or another device. The quality of traffic transmitted through the RAN may depend upon environmental conditions associated with the RAN. For example, the traffic may experience wireless interference associated with the RAN, congestion associated with the RAN, packet loss associated with the RAN, and/or the like, which reduces the quality of the traffic and a user experience for a user of a UE. Thus, current mechanisms for transmitting and receiving traffic via a RAN consume computing resources (e.g., processing resources, memory resources, communication resources, and/or the like), networking resources, and/or other resources associated with identifying a poor user experience associated with poor quality traffic, identifying an issue causing the poor quality traffic, correcting the issue causing the poor quality traffic, handling complaints associated with the poor user experience, and/or the like.

Some implementations described herein provide an optimization system that identifies and corrects issues associated with a wireless network based on detecting a performance impact of a machine learning model being executed by an application of a MEC device. For example, the optimization system may receive network data identifying a signal-to-interference-and-noise ratio (SINR), a received signal strength indicator (RSSI), congestion, and throughput associated with a RAN and/or a core network, device data identifying latency and packet loss associated with the RAN and/or the core network, and an issue inference confidence score associated a machine learning model being executed on a MEC device. The optimization system may process the network data, the device data, and the issue inference confidence score, with a model, to determine whether one or more issues with the RAN are SINR/RSSI issues, network latency and throughput issues, slice latency and throughput issues, or congestion issues. The optimization system may adjust transmission time interval (TTI) bundling to generate adjusted TTI bundling based on the one or more issues with the RAN being SINR/RSSI issues, or may lower a quality of service (QOS) class identifier (QCI) or a QoS flow identifier (QFI) and adjust associated parameters to generate QCI/QFI adjusted parameters based on the one or more issues with the RAN being network latency and throughput issues. The optimization system may adjust slice parameters to generate adjusted slice parameters based on the one or more issues with the RAN being slice latency and throughput issues, or may adjust discontinuous reception (DRX) parameters to generate adjusted DRX parameters based on the one or more issues with the RAN being congestion issues. The optimization system may cause the adjusted TTI bundling, the QCI/QFI adjusted parameters, the adjusted slice parameters, or the adjusted DRX parameters to be implemented by the RAN.

In this way, the optimization system identifies and corrects issues associated with a wireless network. For example, the optimization system may receive network data identifying an SINR, an RSSI, congestion, and throughput associated with a RAN and/or a core network, device data identifying latency and packet loss associated with an MEC device, and an issue inference confidence score associated with a machine learning model of the MEC device. The optimization system may utilize the network data, the device data, and the issue inference confidence score to identify one or more issues associated with the RAN and/or the core network. The optimization system may also determine one or more corrections to address the one or more issues. Thus, the optimization system may conserve computing resources, networking resources, and/or other resources that would otherwise have been consumed in identifying a poor user experience associated with poor quality traffic, identifying an issue causing the poor quality traffic, correcting the issue causing the poor quality traffic, handling complaints associated with the poor user experience, and/or the like.

FIGS. 1A-1G are diagrams of an example 100 associated with identifying and correcting issues associated with a wireless network. As shown in FIGS. 1A-1G, example 100 includes a UE 105, a RAN 110, an optimization system 115, an MEC device, and an inferencing engine. Further details of the UE 105, the RAN 110, the optimization system 115, the MEC device, and the inferencing engine are provided elsewhere herein. Although only a single UE 105 is depicted in FIG. 1A, in some implementations multiple UEs 105 may be associated with the RAN 110. In some implementations, the RAN 110 may include and be associated with a core network (e.g., a 5G core network, a 4G core network, and/or the like).

As shown in FIG. 1A, and by reference number 120, the UE 105 may communicate with the MEC device via the RAN 110. For example, the UE 105 may establish a session with the MEC device, via the RAN 110, and may communicate with the MEC device via the session. In some implementations, multiple UEs 105 may utilize the RAN 110 to communicate with the MEC device, other MEC devices, a core network, a data network, and/or the like. Such communications may generate traffic that causes the RAN 110 to experience an SINR, an RSSI, congestion, throughput, latency, packet loss, and/or the like.

In some implementations, the RAN 110 may be agnostic to a type of radio access technology (RAT) and/or band utilized by the UE 105. In such implementations, the optimization system 115 may change a parameter based on the RAT and/or the band utilized by the UE 105. For example, capabilities of the UE 105 may be shared with each eNodeB or gNodeB utilized by the UE 105 regardless of whether the RAN 110 is a 4G or 5G RAN. During that process, the RAN 110 may instruct the UE 105 about a preferred band to utilized based on thresholds set by the RAN 110. The RAN 110 may dynamically switch the thresholds or may force a handover of the UE 105 between nodes of the RAN 110. In some implementations, the RAN 110 may include a Wi-Fi network, a femtocell network, and/or the like.

As further shown in FIG. 1A, and by reference number 125, the optimization system 115 may receive network data identifying an SINR, an RSSI, congestion, and throughput associated with the RAN 110. For example, the optimization system 115 may receive, from the RAN 110, the SINR, the RSSI, the congestion, and/or the throughput associated with the RAN 110. The SINR may include a quantity used to provide upper bounds on channel capacity, or a rate of information transfer, in the RAN 110. The SINR may be defined as a power of a signal of interest divided by a sum of an interference power (from all other interfering signals) and a power of background noise. The RSSI may include a measurement of power present in a received radio signal from the RAN 110. The congestion may include a reduced QoS that occurs when the RAN 110 is carrying more data than the RAN 110 can handle. Typical effects of congestion may include queueing delay, packet loss, blocking of new connections, a decrease in the throughput, and/or the like. The throughput may include a rate of successful message delivery over a communication channel by the RAN 110 (e.g., to the UE 105).

As further shown in FIG. 1A, and by reference number 130, the optimization system 115 may receive device data identifying latency and packet loss associated with the RAN 110. For example, in an edge use case, the MEC device may stream device data (e.g., video data) to the UE 105 via the RAN 110, or the UE 105 (e.g., a video camera) may transmit high throughput device data (e.g., video data) through the RAN 110 to the MEC device. A quality of traffic transmitted through the RAN 110 may depend upon environmental conditions associated with the RAN 110. For example, the device data may experience latency associated with the RAN 110, packet loss associated with the RAN 110, and/or the like, which reduces the quality of the traffic and a user experience for a user of the UE 105. The MEC device may provide the device data to the optimization system 115, and the optimization system 115 may receive the device data identifying the latency and the packet loss associated with the RAN 110.

As further shown in FIG. 1A, and by reference number 135, the optimization system 115 may receive an issue inference confidence score associated with the MEC device. For example, the MEC device may include a machine learning model and/or an application that utilizes a machine learning model. The inferencing engine may process the device data and may predict an issue associated with the machine learning model of the MEC device based on processing the device data. The inferencing engine may also predict an issue confidence score associated with the predicted issue. For example, the inferencing engine may predict an issue associated with the machine learning model and an issue confidence score of 20% (e.g., a low issue confidence score). In another example, the inferencing engine may predict an issue associated with the machine learning model and an issue confidence score of 80% (e.g., a high issue confidence score). In some implementations, the issue confidence score may be provided in a different format than percentages, such as a scaled score (e.g., from one to ten, with ten being a greatest score). The inferencing engine may provide the issue inference confidence score to the optimization system 115, and the optimization system 115 may receive the issue inference confidence score associated with the machine learning model.

Figure 1B:
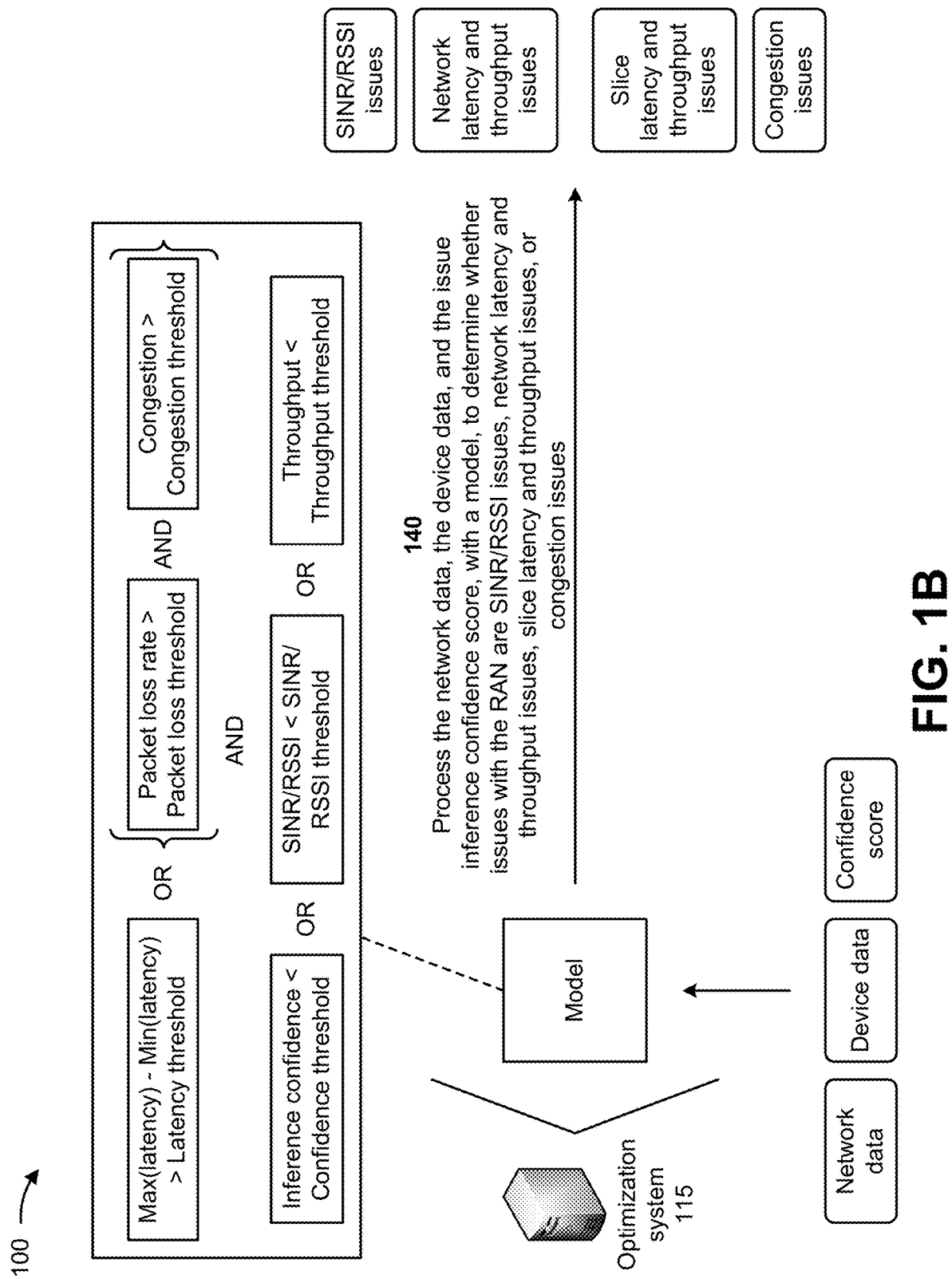

As shown in FIG. 1B, and by reference number 140, the optimization system 115 may process the network data, the device data, and the issue inference confidence score, with a model, to determine whether one or more issues associated with the RAN 110 are SINR/RSSI issues, network latency and throughput issues, slice latency and throughput issues, or congestion issues. For example, the model may process the network data, the device data, and the issue inference confidence score to determine whether one or more issues associated with the RAN 110 are SINR/RSSI issues, network latency and throughput issues, slice latency and throughput issues, or congestion issues. In some implementations, when the inference confidence score satisfies a confidence threshold (e.g., is less than the confidence threshold), the optimization system 115 may process the network data, the device data, and the issue inference confidence score, with a model, to determine whether the one or more issues associated with the RAN 110 are SINR/RSSI issues, network latency and throughput issues, slice latency and throughput issues, or congestion issues.

In some implementations, the model may identify, from the device data, a maximum latency and a minimum latency associated with the RAN 110, and may subtract the minimum latency from the maximum latency to determine a latency value associated with the RAN 110. The model may determine whether the latency value is greater than a latency threshold (e.g., a first determination). The model may calculate, based on the device data, a packet loss rate associated with the RAN 110 based on the packet loss associated with the RAN 110, and may determine whether the packet loss rate is greater than a packet loss threshold (e.g., a second determination). The model may determine whether the congestion associated with the RAN 110, and included in the network data, is greater than a congestion threshold (e.g., a third determination).

In some implementations, the model may determine whether the inference confidence score associated with the machine learning model is less than a confidence threshold (e.g., a fourth determination). The model may determine whether the SINR and/or the RSSI associated with the RAN 110, and included in the network data, is less than an SINR and/or RSSI threshold (e.g., a fifth determination). The model may also determine whether the throughput associated with the RAN 110, and included in the network data, is less than a throughput threshold (e.g., a sixth determination). The model may utilize the first determination, or a combination of the second determination and the third determination, and one of the fourth determination, the fifth determination, or the sixth determination when determining whether the one or more issues associated with the RAN 110 are SINR/RSSI issues, network latency and throughput issues, slice latency and throughput issues, or congestion issues. In some implementations, the model may utilize different combinations of the first through sixth determinations when determining whether the one or more issues associated with the RAN 110 are SINR/RSSI issues, network latency and throughput issues, slice latency and throughput issues, or congestion issues.

Figure 1C:
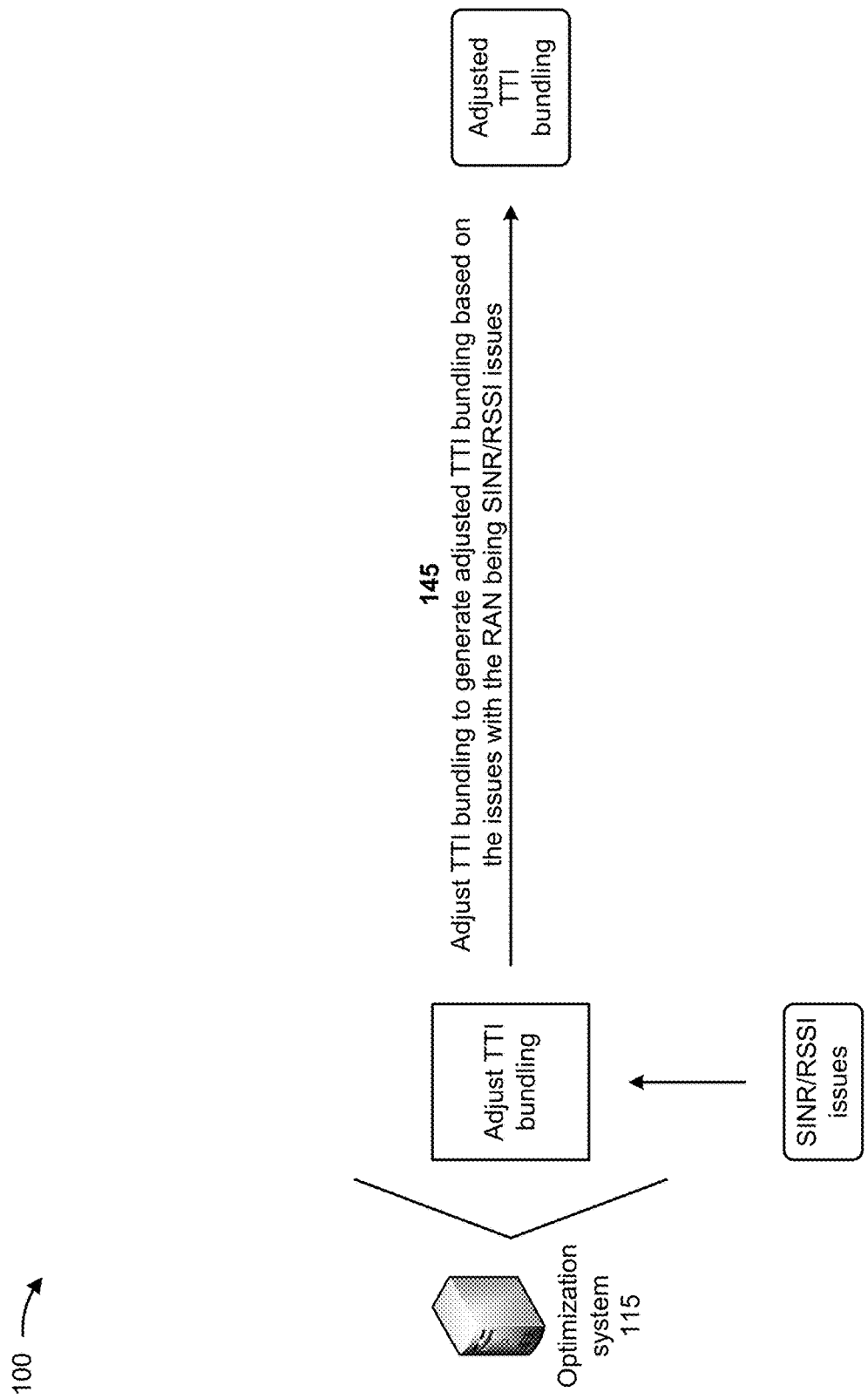

As shown in FIG. 1C, and by reference number 145, the optimization system 115 may adjust transmission time interval (TTI) bundling to generate adjusted TTI bundling based on the issues with the RAN 110 being SINR/RSSI issues. For example, when the one or more issues associated with the RAN 110 are determined to be SINR/RSSI issues, optimization system 115 may adjust the TTI bundling to generate the adjusted TTI bundling. TTI bundling may include a technique to improve uplink performance of the UE 105 (e.g., a voice-over-Long-Term-Evolution (VOLTE) device) when a transmission power of the UE 105 is low or service is unreliable. During poor radio frequency (RF) situations with the RAN 110, the UE 105 may receive data multiple times (e.g., up to four times) to increase a likelihood that duplicate data will be received (e.g., at least once) by the RAN 110. TTI bundling may be utilized at an edge of the RAN 110, may be correlated with poor SINR, and may indicate that service became poor at a specific period of time. The optimization system 115 may adjust the TTI bundling associated with the UE 105 to mitigate the SINR/RSSI issues associated with the RAN 110. For example, the optimization system 115 may increase the TTI bundling from two to three or four, which may reduce signaling overhead and/or latency associated with the RAN 110. In some implementations, when adjusting the TTI bundling to generate the adjusted TTI bundling, the optimization system 115 may adjust an uplink performance of the RAN 110 to generate the adjusted TTI bundling. In some implementations, the TTI bundling may be associated other UE 105 changes (e.g., device-level configuration changes, such as transmit power or increasing memory utilization on the UE 105 to improve UE 105 level performance).

Figure 1D:
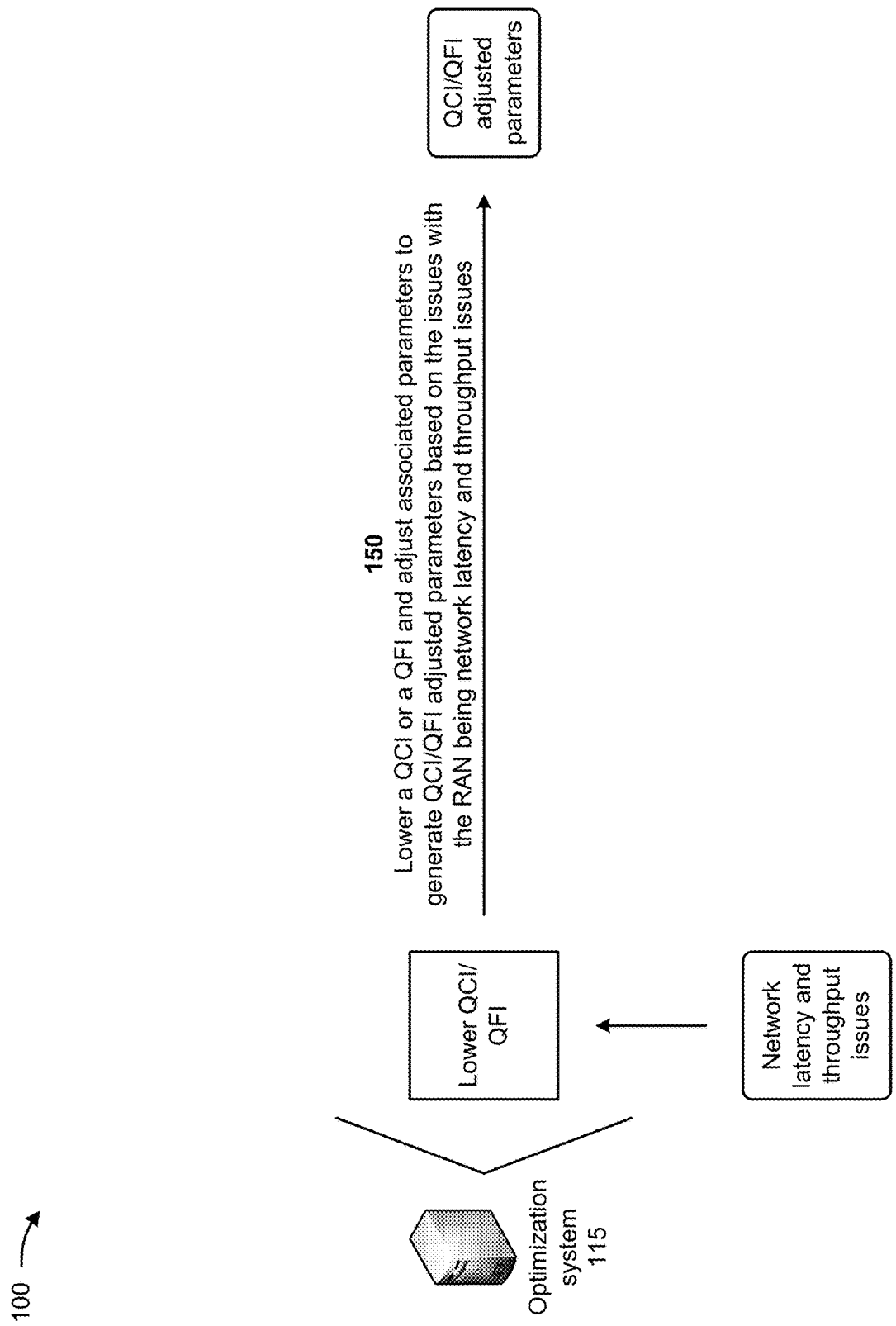

As shown in FIG. 1D, and by reference number 150, the optimization system 115 may lower a QCI or a QFI and may adjust associated parameters to generate QCI/QFI adjusted parameters based on the issues with the RAN 110 being network latency and throughput issues. For example, when the one or more issues associated with the RAN 110 are determined to be network latency and throughput issues, optimization system 115 may lower the QCI or the QFI and may adjust the associated parameters to generate the QCI/QFI adjusted parameters. QoS may be utilized to manage traffic associated with the RAN 110 and that is sensitive to delay or needs to be highly reliable. In a 4G network, the QCI may be utilized to manage traffic and may be assigned to the traffic based on a traffic type. Based on the assigned QCI, the RAN 110 may prioritize the traffic received by the RAN 110. A lower QCI may affect the UE 105 when there is congestion in the RAN 110. Thus, the optimization system 115 may increase the QCI, and associated QCI parameters, for the RAN 110 to mitigate the network latency and throughput issues associated with the RAN 110. For example, the optimization system 115 may increase a QCI value to reduce the effect of congestion in the RAN 110 on a QoS experienced by the UE 105. In some implementations, when lowering the QCI and adjusting the associated parameters, the optimization system 115 may lower the QCI for traffic associated with the UE 105, and may cause the RAN 110 to prioritize the traffic based on lowering the QCI for the traffic.

In a 5G network, the QFI may be utilized to manage traffic and may be assigned to the traffic based on a traffic type. The QFI may be used to identify a QoS flow in the RAN 110 so that user plane traffic with the same QFI within a session receives the same traffic forwarding treatment (e.g., scheduling, admission threshold, and/or the like). Based on the assigned QFI, the RAN 110 may prioritize the traffic received by the RAN 110. A lower QFI may affect the UE 105 when there is congestion in the RAN 110. Thus, the optimization system 115 may increase the QFI, and associated QFI parameters, for the RAN 110 to mitigate the network latency and throughput issues associated with the RAN 110. For example, the optimization system 115 may increase a QFI value to reduce the effect of congestion in the RAN 110 on a QoS experienced by the UE 105. In some implementations, when lowering the QFI and adjusting the associated parameters, the optimization system 115 may lower the QFI for traffic associated with the UE 105, and may cause the RAN 110 to prioritize the traffic based on lowering the QFI for the traffic.

Figure 1E:
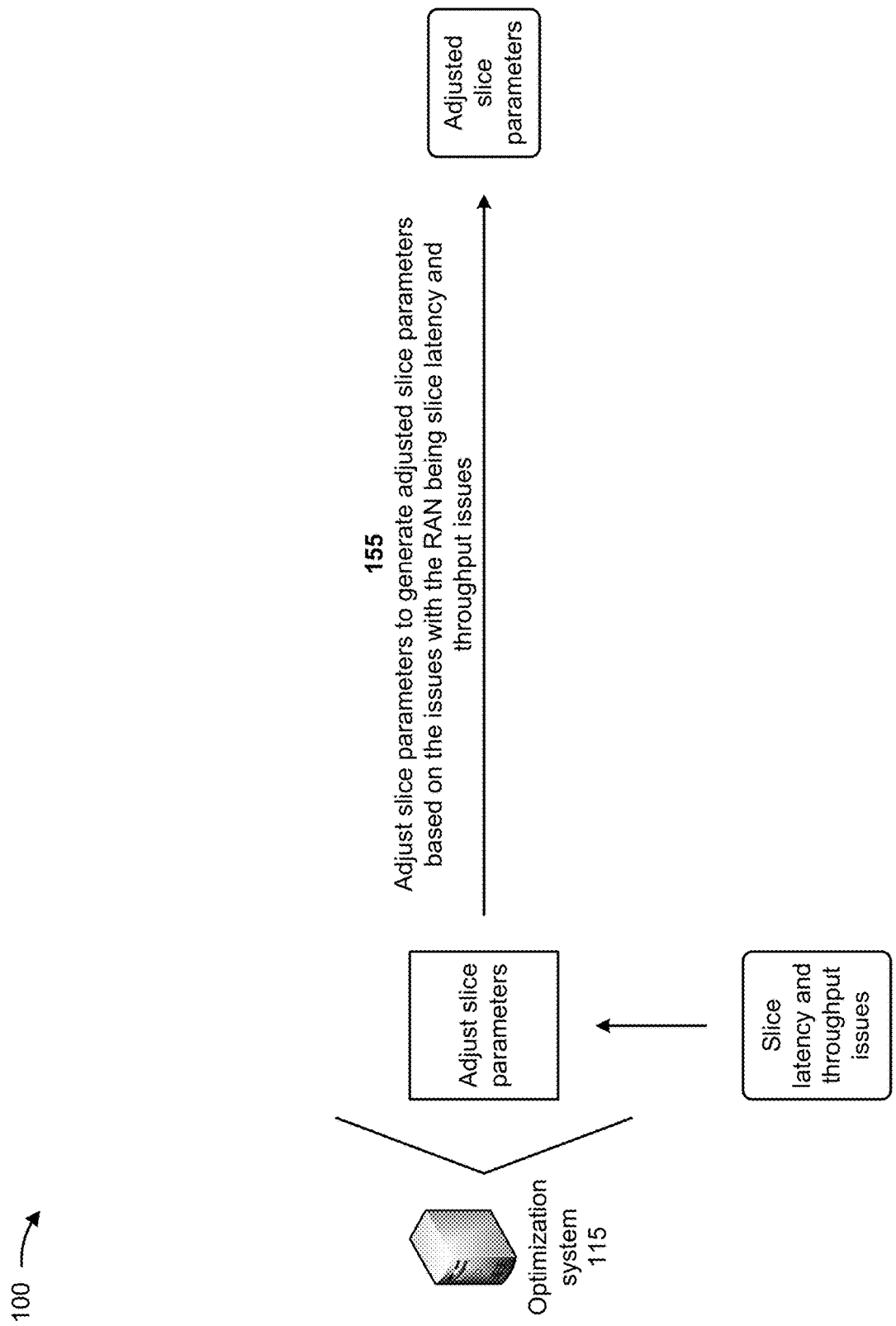

As shown in FIG. 1E, and by reference number 155, the optimization system 115 may adjust slice parameters to generate adjusted slice parameters based on the issues with the RAN 110 being slice latency and throughput issues. For example, when the one or more issues associated with the RAN 110 are determined to be slice latency and throughput issues, optimization system 115 may adjust the slice parameters to generate the adjusted slice parameters. In some implementations, when the UE 105 registers with the RAN 110, a registration request from the UE 105 may include slice information or parameters, such as single network slice selection assistance information (S-NSSAI). The slice information may enable the UE 105 to access and/or utilize services provided by network slices of a 5G core network. In some implementations, when adjusting the slice parameters, the optimization system 115 may adjust S-NSSAI associated with the UE 105. For example, the optimization system 115 may adjust the S-NSSAI associated with the UE 105 so that the UE 105 accesses and utilizes a less congested network function of the 5G core network.

Figure 1F:
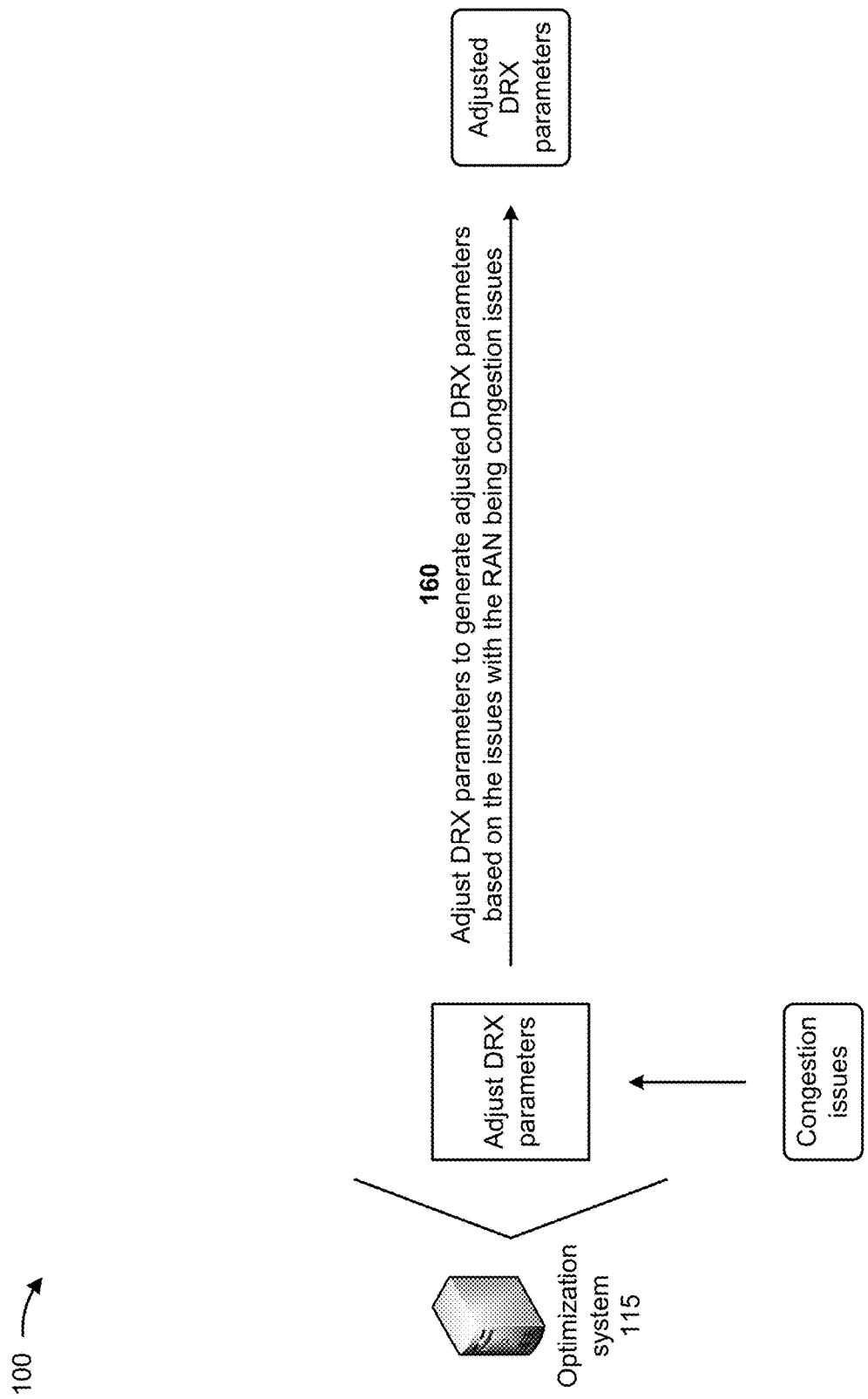

As shown in FIG. 1F, and by reference number 160, the optimization system 115 may adjust discontinuous reception (DRX) parameters to generate adjusted DRX parameters based on the issues with the RAN 110 being congestion issues. For example, when the one or more issues associated with the RAN 110 are determined to be congestion issues, optimization system 115 may adjust the DRX parameters to generate the adjusted DRX parameters. Adjusting one or more of the DRX parameters may reduce latency in the RAN 110. The DRX parameters may include a DRX inactivity timer, a short DRX cycle, a DRX short cycle timer, a long DRX cycle start offset, a DRX duration timer, a DRX retransmission timer, and/or the like.

The DRX inactivity timer specifies a quantity of consecutive physical downlink control channel (PDCCH) subframes for which the UE 105 may be active after successfully decoding a PDCCH indicating a new transmission (e.g., uplink or downlink). The DRX inactivity timer may be restarted upon receiving a PDCCH for a new transmission. Upon expiration of the DRX inactivity timer, the UE 105 may enter into a DRX mode. The short DRX cycle is a type of DRX cycle to be followed when the UE 105 enters the DRX mode. The short DRX cycle may indicate a length of the short cycle in subframes, such as an "on" time followed by a possible "off" (e.g., inactivity) time. The DRX short cycle timer may be expressed as multiples of the short DRX cycle. A DRX short cycle timer value may vary from one to sixteen (e.g., short DRX cycles). The DRX short cycle timer may indicate a quantity of initial DRX cycles to follow the short DRX cycle before entering the long DRX cycle. The long DRX cycle start offset may define a long DRX cycle length as well as a DRX offset. The DRX offset may be used to calculate a starting subframe number for a DRX cycle. The DRX duration timer may specify a quantity of consecutive PDCCH subframes at a beginning of each DRX cycle (e.g., the quantity of subframes over which the UE 105 may read a PDCCH during every DRX cycle before entering a power saving DRX "off" mode. The DRX retransmission timer may indicate a maximum quantity of subframes for which the UE 105 may monitor a PDCCH when a retransmission from the RAN 110 is expected by the UE 105.

The optimization system 115 may adjust one or more of the DRX parameters to mitigate the congestion issues associated with the RAN 110. In some implementations, the optimization system 115 may adjust a connected mode DRX (CDRX) timer configuration associated with the UE 105 of the RAN 110. For example, the optimization system 115 may adjust a configuration of CDRX values on a per flow basis (e.g., via a 5G QoS indicator), on a per UE basis (e.g., via a radio access technology (RAT)/frequency priority index), on a per slice basis (e.g., via an S-NSSAI), and/or the like.

As shown in FIG. 1G, and by reference number 165, the optimization system 115 may cause one or more of the adjusted TTI bundling, the QCI/QFI adjusted parameters, the adjusted slice parameters, or the adjusted DRX parameters to be implemented by the RAN 110 (e.g., and/or the UE 105). For example, when causing the adjusted TTI bundling to be implemented by the RAN 110, the optimization system 115 may cause the adjusted TTI bundling to be implemented by the RAN 110, and may determine whether the adjusted TTI bundling reduces the SINR/RSSI issues associated with the RAN 110. When the adjusted TTI bundling reduces the SINR/RSSI issues associated with the RAN 110, the optimization system 115 may maintain the adjusted TTI bundling. When the adjusted TTI bundling fails to reduce the SINR/RSSI issues associated with the RAN 110, the optimization system 115 may further adjust the TTI bundling in an attempt to reduce the SINR/RSSI issues.

When causing the QCI/QFI adjusted parameters to be implemented by the RAN 110, the optimization system 115 may cause the QCI/QFI adjusted parameters to be implemented by the RAN 110, and may determine whether the QCI/QFI adjusted parameters reduce the network latency and throughput issues associated with the RAN 110. When the QCI/QFI adjusted parameters reduce the network latency and throughput issues associated with the RAN 110, the optimization system 115 may maintain the QCI/QFI adjusted parameters. When the QCI/QFI adjusted parameters fail to reduce the network latency and throughput issues associated with the RAN 110, the optimization system 115 may further adjust the QCI/QFI parameters in an attempt to reduce the network latency and throughput issues.

When causing the adjusted slice parameters to be implemented by the RAN 110, the optimization system 115 may cause the adjusted slice parameters to be implemented by the RAN 110, and may determine whether the adjusted slice parameters reduce the slice latency and throughput issues associated with the RAN 110. When the adjusted slice parameters reduce the slice latency and throughput issues associated with the RAN 110, the optimization system 115 may maintain the adjusted slice parameters. When the adjusted slice parameters fail to reduce the slice latency and throughput issues associated with the RAN 110, the optimization system 115 may further adjust the slice parameters in an attempt to reduce the slice latency and throughput issues.

When causing the adjusted DRX parameters to be implemented by the RAN 110, the optimization system 115 may cause the adjusted DRX parameters to be implemented by the RAN 110, and may determine whether the adjusted DRX parameters reduce the congestion issues associated with the RAN 110. When the adjusted DRX parameters reduce the congestion issues associated with the RAN 110, the optimization system 115 may maintain the adjusted DRX parameters. When the adjusted DRX parameters fail to reduce the congestion issues associated with the RAN 110, the optimization system 115 may further adjust the DRX parameters in an attempt to reduce the congestion issues.

In this way, the optimization system 115 identifies and corrects issues associated with a wireless network (e.g., the RAN 110). For example, the optimization system 115 may receive network data identifying an SINR, an RSSI, congestion, and throughput associated with the RAN 110, device data identifying latency and packet loss associated with an MEC device, and an issue inference confidence score associated with the machine learning model of the MEC device. The optimization system 115 may utilize the network data, the device data, and the issue inference confidence score to identify one or more issues associated with the RAN 110. The optimization system 115 may also determine one or more corrections to address the one or more issues. Thus, the optimization system 115 may conserve computing resources, networking resources, and/or other resources that would otherwise have been consumed in identifying a poor user experience associated with poor quality traffic, identifying an issue causing the poor quality traffic, correcting the issue causing the poor quality traffic, handling complaints associated with the poor user experience, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
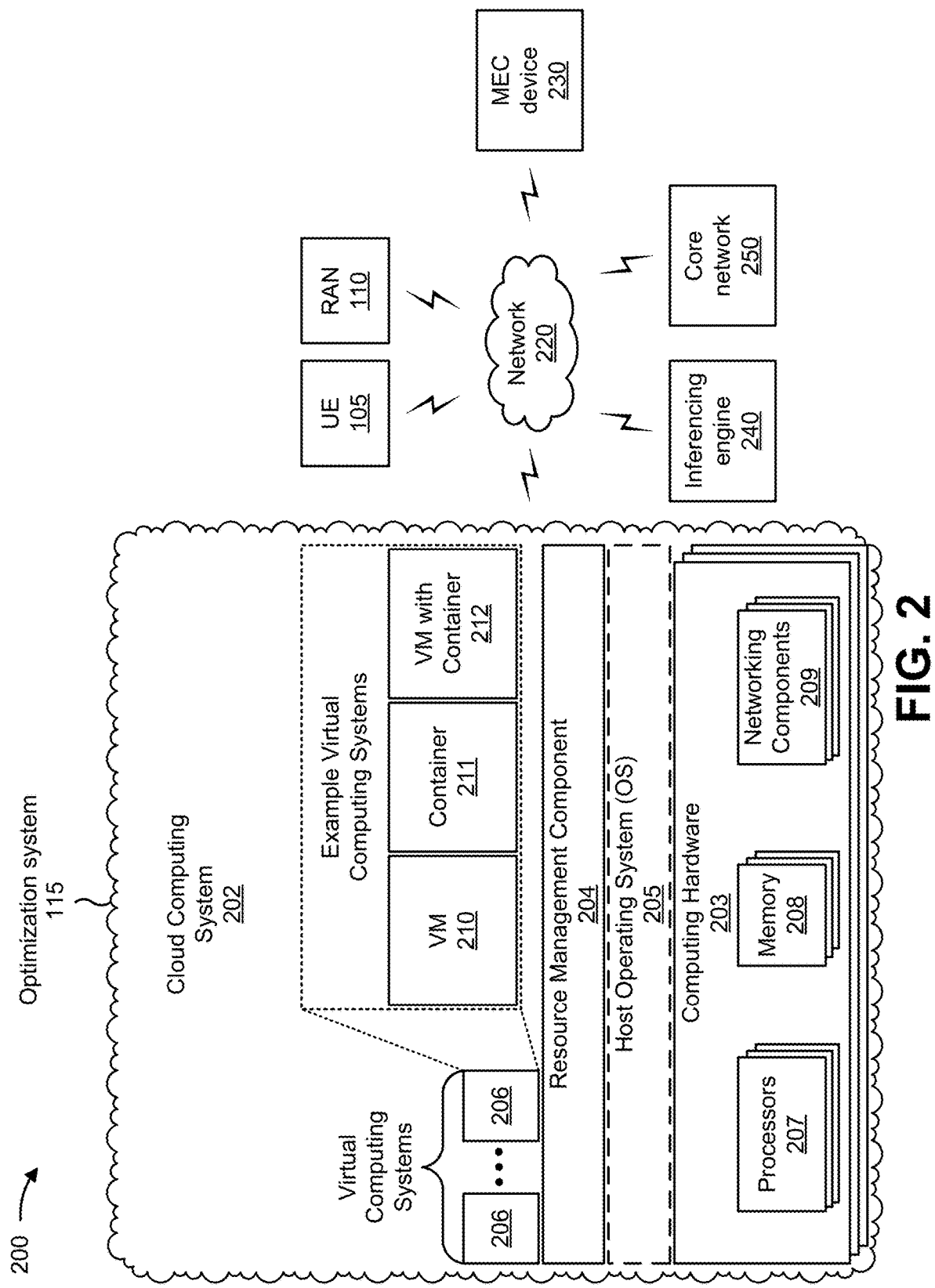
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the optimization system 115, which may include one or more elements of and/or may execute within a cloud computing system 202. The cloud computing system 202 may include one or more elements 203-212, as described in more detail below. As further shown in FIG. 2, the environment 200 may include the UE 105, the RAN 110, a network 220, an MEC device 230, an inferencing engine 240, and/or a core network 250. Devices and/or elements of the environment 200 may interconnect via wired connections and/or wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the optimization system 115 may include one or more elements 203-212 of the cloud computing system 202, may execute within the cloud computing system 202, and/or may be hosted within the cloud computing system 202, in some implementations, the optimization system 115 may not be cloud-based (e.g., may be implemented outside of a cloud computing system) or may be partially cloud-based. For example, the optimization system 115 may include one or more devices that are not part of the cloud computing system 202, such as a device 300 of FIG. 3, which may include a standalone server or another type of computing device. The optimization system 115 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The MEC device 230 includes one or more devices capable of receiving, generating, storing, processing, providing, and/or routing information, as described elsewhere herein. The MEC device 230 may include a communication device and/or a computing device. For example, the MEC device 230 may include a server, such as an application server, a client server, a web server, a database server, a host server, a proxy server, a virtual server (e.g., executing on computing hardware), or a server in a cloud computing system. In some implementations, the MEC device 230 includes computing hardware used in a cloud computing environment. The MEC device 230 may provide services and computing functions, required by UEs 105, on edge nodes. The MEC device 230 may provide application services and content closer to UEs 105 and may implement network collaboration.

The inferencing engine 240 includes one or more devices capable of receiving, generating, storing, processing, providing, and/or routing information, as described elsewhere herein. The inferencing engine 240 may include a communication device and/or a computing device. For example, the inferencing engine 240 may include a server, such as an application server, a client server, a web server, a database server, a host server, a proxy server, a virtual server (e.g., executing on computing hardware), or a server in a cloud computing system. In some implementations, the inferencing engine 240 includes computing hardware used in a cloud computing environment. In some implementations, the inferencing engine 240 may include a machine learning model that generates inferences identifying issues associated with the RAN 110 (e.g., based on the network data and/or the device data) and confidence scores for the inferences.

In some implementations, the core network 250 may include an example functional architecture in which systems and/or methods described herein may be implemented. For example, the core network 250 may include an example architecture of a fifth generation (5G) next generation (NG) core network included in a 5G wireless telecommunications system. While the example architecture of the core network 250 shown in FIG. 2 may be an example of a service-based architecture, in some implementations, the core network 250 may be implemented as a reference-point architecture and/or a 4G core network, among other examples.

The core network 250 may include a number of functional elements. The functional elements may include, for example, a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF) These functional elements may be communicatively connected via a message bus. Each of the functional elements may be implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF includes one or more devices that select network slice instances for the UE 105. By providing network slicing, the NSSF allows an operator to deploy multiple substantially independent end-to-end networks potentially with the same infrastructure. In some implementations, each slice may be customized for different services. The NEF includes one or more devices that support exposure of capabilities and/or events in the wireless telecommunications system to help other entities in the wireless telecommunications system discover network services. The AUSF includes one or more devices that act as an authentication server and support the process of authenticating the UE 105 in the wireless telecommunications system. The UDM includes one or more devices that store user data and profiles in the wireless telecommunications system. The UDM may be used for fixed access and/or mobile access in the core network 250. The PCF includes one or more devices that provide a policy framework that incorporates network slicing, roaming, packet processing, and/or mobility management, among other examples. The AF includes one or more devices that support application influence on traffic routing, access to the NEF, and/or policy control, among other examples. The AMF includes one or more devices that act as a termination point for non-access stratum (NAS) signaling and/or mobility management, among other examples. The SMF includes one or more devices that support the establishment, modification, and release of communication sessions in the wireless telecommunications system. For example, the SMF may configure traffic steering policies at the UPF and/or may enforce user equipment IP address allocation and policies, among other examples. The UPF includes one or more devices that serve as an anchor point for intraRAT and/or interRAT mobility. The UPF may apply rules to packets, such as rules pertaining to packet routing, traffic reporting, and/or handling user plane QoS, among other examples. The message bus represents a communication structure for communication among the functional elements. In other words, the message bus may permit communication between two or more functional elements.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
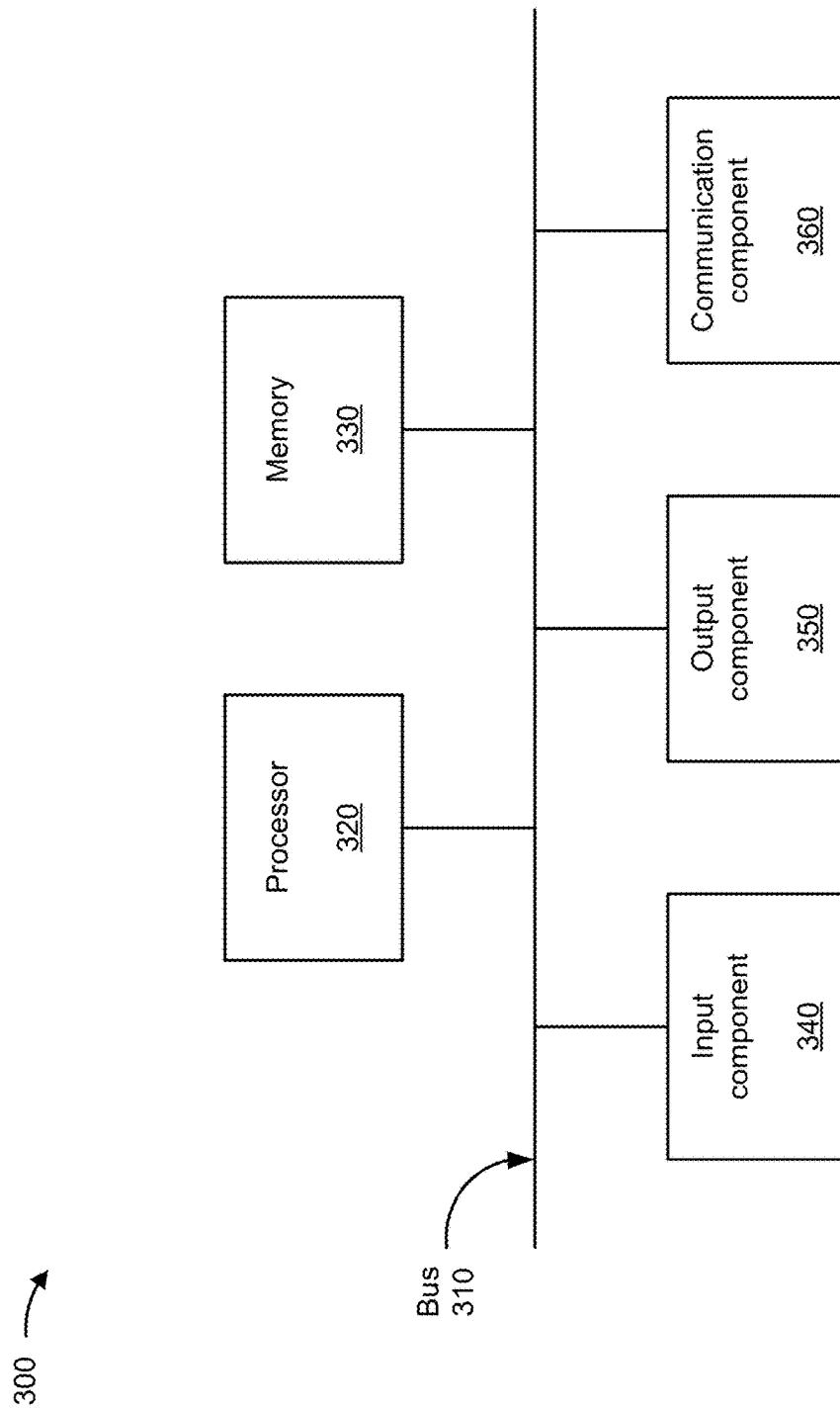
FIG. 3 is a diagram of example components of one or more devices of FIG. 2.

FIG. 3 is a diagram of example components of a device 300, which may correspond to the UE 105, the RAN 110, the optimization system 115, the MEC device 230, the inferencing engine 240, and/or one or more devices of the core network 250. In some implementations, the UE 105, the RAN 110, the optimization system 115, the MEC device 230, inferencing engine 240, and/or the one or more devices of the core network 250 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
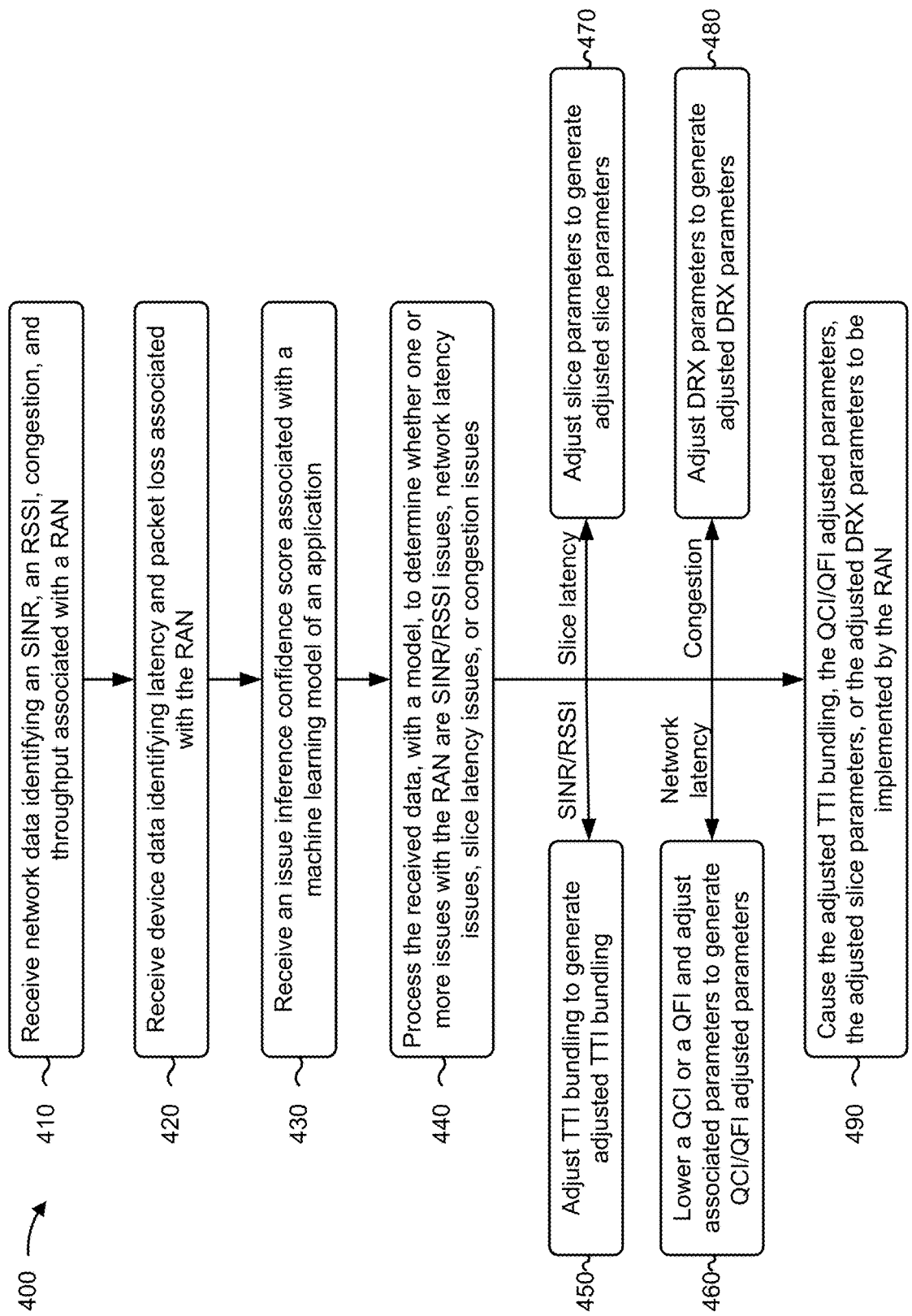
FIG. 4 is a flowchart of an example process for identifying and correcting issues associated with a wireless network.

FIG. 4 is a flowchart of an example process 400 for identifying and correcting issues associated with a wireless network. In some implementations, one or more process blocks of FIG. 4 may be performed by a device (e.g., the optimization system 115). In some implementations, one or more process blocks of FIG. 4 may be performed by another device or a group of devices separate from or including the device, such as an MEC device (e.g., the MEC device 230) and/or an inferencing engine (e.g., the inferencing engine 240). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving network data identifying an SINR, an RSSI, congestion, and throughput associated with a RAN (block 410). For example, the device may receive network data identifying an SINR, an RSSI, congestion, and throughput associated with a RAN, as described above.

As further shown in FIG. 4, process 400 may include receiving device data identifying latency and packet loss associated with the RAN (block 420). For example, the device may receive device data identifying latency and packet loss associated with the RAN, as described above.

As further shown in FIG. 4, process 400 may include receiving an issue inference confidence score associated with a machine learning model of an application (block 430). For example, the device may receive an issue inference confidence score associated with the machine learning model of the MEC device, as described above.

As further shown in FIG. 4, process 400 may include processing the network data, the device data, and the issue inference confidence score, with a model, to determine whether one or more issues with the RAN are SINR/RSSI issues, network latency issues, slice latency issues, or congestion issues (block 440). For example, the device may process the network data, the device data, and the issue inference confidence score, with a model, to determine whether one or more issues with the RAN are SINR/RSSI issues, network latency and throughput issues, slice latency and throughput issues, or congestion issues.

In some implementations, processing the network data, the device data, and the issue inference confidence score, with a model, includes one or more of determining whether a maximum latency associated with the RAN, less a minimum latency associated with the RAN, is greater than a latency threshold; determining whether the packet loss associated with the RAN is greater than a packet loss threshold and whether the congestion associated with the RAN is greater than a congestion threshold; determining whether the issue inference confidence score associated with the machine learning model is less than a confidence threshold; determining whether the SINR associated with the RAN is less than an SINR threshold or whether the RSSI associated with the RAN is less than an RSSI threshold; or determining whether the throughput associated with the RAN is less than a throughput threshold.

As further shown in FIG. 4, process 400 may include adjusting TTI bundling to generate adjusted TTI bundling (block 450). For example, the device may adjust TTI bundling to generate adjusted TTI bundling based on the one or more issues with the RAN being SINR/RSSI issues, as described above. In some implementations, adjusting the TTI bundling to generate the adjusted TTI bundling includes adjusting uplink performance of the RAN to generate the adjusted TTI bundling.

As further shown in FIG. 4, process 400 may include lowering a QCI or a QFI and adjusting associated parameters to generate QCI/QFI adjusted parameters (block 460). For example, the device may lower a QCI or a QFI and adjust associated parameters to generate QCI/QFI adjusted parameters based on the one or more issues with the RAN being network latency and throughput issues, as described above. In some implementations, lowering the QCI or the QFI and adjusting the associated parameters to generate the QCI/QFI adjusted parameters includes lowering the QCI for traffic associated with a user equipment of the RAN, and causing the RAN to prioritize the traffic based on lowering the QCI for the traffic. In some implementations, lowering the QCI or the QFI and adjusting the associated parameters to generate the QCI/QFI adjusted parameters includes lowering the QFI for traffic associated with a user equipment of the RAN, and causing the RAN to prioritize the traffic based on lowering the QFI for the traffic.

In some implementations, lowering the QCI or the QFI and adjusting the associated parameters to generate the QCI/QFI adjusted parameters includes one of lowering the QCI, based on the RAN being associated with a fourth-generation network and adjusting the associated parameters to generate QCI adjusted parameters, or lowering the QFI, based on the RAN being associated with a fifth-generation network and adjusting the associated parameters to generate QFI adjusted parameters.

As further shown in FIG. 4, process 400 may include adjusting slice parameters to generate adjusted slice parameters (block 470). For example, the device may adjust slice parameters to generate adjusted slice parameters based on the one or more issues with the RAN being slice latency and throughput issues, as described above. In some implementations, adjusting the slice parameters to generate the adjusted slice parameters includes adjusting single network slice selection assistance information associated with a user equipment of the RAN.

As further shown in FIG. 4, process 400 may include adjusting DRX parameters to generate adjusted DRX parameters (block 480). For example, the device may adjust DRX parameters to generate adjusted DRX parameters based on the one or more issues with the RAN being congestion issues, as described above. In some implementations, adjusting the DRX parameters to generate the adjusted DRX parameters includes one or more of adjusting a DRX inactivity timer associated with a user equipment of the RAN; adjusting a short DRX cycle associated with a user equipment of the RAN; adjusting a DRX short cycle timer associated with a user equipment of the RAN; adjusting a long DRX cycle start offset associated with a user equipment of the RAN; adjusting a DRX duration timer associated with a user equipment of the RAN; or adjusting a DRX retransmission timer associated with a user equipment of the RAN.

In some implementations, adjusting the DRX parameters to generate the adjusted DRX parameters includes adjusting a connected mode DRX timer configuration associated with a user equipment of the RAN.

As further shown in FIG. 4, process 400 may include causing the adjusted TTI bundling, the QCI/QFI adjusted parameters, the adjusted slice parameters, or the adjusted DRX parameters to be implemented by the RAN (block 490). For example, the device may cause the adjusted TTI bundling, the QCI/QFI adjusted parameters, the adjusted slice parameters, or the adjusted DRX parameters to be implemented by the RAN, as described above. In some implementations, causing the adjusted TTI bundling, the QCI/QFI adjusted parameters, the adjusted slice parameters, or the adjusted DRX parameters to be implemented by the RAN includes causing the adjusted TTI bundling to be implemented by the RAN, determining whether the adjusted TTI bundling reduces the SINR/RSSI issues, and further adjusting the TTI bundling based on whether the adjusted TTI bundling reduces the SINR/RSSI issues.

In some implementations, causing the adjusted TTI bundling, the QCI/QFI adjusted parameters, the adjusted slice parameters, or the adjusted DRX parameters to be implemented by the RAN includes causing the QCI/QFI adjusted parameters to be implemented by the RAN, determining whether the QCI/QFI adjusted parameters reduce the network latency and throughput issues, and further adjusting the QCI/QFI parameters based on whether the QCI/QFI adjusted parameters reduce the network latency and throughput issues.

In some implementations, causing the adjusted TTI bundling, the QCI/QFI adjusted parameters, the adjusted slice parameters, or the adjusted DRX parameters to be implemented by the RAN includes causing the adjusted slice parameters to be implemented by the RAN, determining whether the adjusted slice parameters reduce the slice latency and throughput issues, and further adjusting the slice parameters based on whether the adjusted slice parameters reduce the slice latency and throughput issues.

In some implementations, causing the adjusted TTI bundling, the QCI/QFI adjusted parameters, the adjusted slice parameters, or the adjusted DRX parameters to be implemented by the RAN includes causing the adjusted DRX parameters to be implemented by the RAN, determining whether the adjusted DRX parameters reduce the congestion issues, and further adjusting the DRX parameters based on whether the adjusted DRX parameters reduce the congestion issues.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, network data identifying a signal-to-interference-plus-noise ratio (SINR), a received signal strength indicator (RSSI), congestion, and throughput associated with a radio access network (RAN);
    receiving, by the device, device data identifying latency and packet loss associated with the RAN;
    receiving, by the device, an issue inference confidence score associated with a machine learning model of an application;
    processing, by the device, the network data, the device data, and the issue inference confidence score, with a model, to determine whether one or more issues with the RAN are SINR/RSSI issues, network latency and throughput issues, slice latency and throughput issues, or congestion issues;
        adjusting, by the device, transmission time interval (TTI) bundling to generate adjusted TTI bundling based on the one or more issues with the RAN being SINR/RSSI issues;
        lowering, by the device, a quality of service (QOS) class identifier (QCI) or a QoS flow identifier (QFI) and adjusting associated parameters to generate QCI/QFI adjusted parameters based on the one or more issues with the RAN being network latency and throughput issues;
        adjusting, by the device, slice parameters to generate adjusted slice parameters based on the one or more issues with the RAN being slice latency and throughput issues; or
        adjusting, by the device, discontinuous reception (DRX) parameters to generate adjusted DRX parameters based on the one or more issues with the RAN being congestion issues; and
    causing, by the device, the adjusted TTI bundling, the QCI/QFI adjusted parameters, the adjusted slice parameters, or the adjusted DRX parameters to be implemented by the RAN.

2. The method of claim 1, wherein processing the network data, the device data, and the issue inference confidence score, with a model, comprises one or more of:
    determining whether a maximum latency associated with the RAN, less a minimum latency associated with the RAN, is greater than a latency threshold;
    determining whether the packet loss associated with the RAN is greater than a packet loss threshold and whether the congestion associated with the RAN is greater than a congestion threshold;
    determining whether the issue inference confidence score associated with the machine learning model is less than a confidence threshold;
    determining whether the SINR associated with the RAN is less than an SINR threshold or whether the RSSI associated with the RAN is less than an RSSI threshold; or
    determining whether the throughput associated with the RAN is less than a throughput threshold.

3. The method of claim 1, wherein adjusting the TTI bundling to generate the adjusted TTI bundling comprises:
    adjusting uplink performance of the RAN to generate the adjusted TTI bundling.

4. The method of claim 1, wherein lowering the QCI or the QFI and adjusting the associated parameters to generate the QCI/QFI adjusted parameters comprises:
    lowering the QCI for traffic associated with a user equipment of the RAN; and
    causing the RAN to prioritize the traffic based on lowering the QCI for the traffic.

5. The method of claim 1, wherein lowering the QCI or the QFI and adjusting the associated parameters to generate the QCI/QFI adjusted parameters comprises:
    lowering the QFI for traffic associated with a user equipment of the RAN; and
    causing the RAN to prioritize the traffic based on lowering the QFI for the traffic.

6. The method of claim 1, wherein adjusting the slice parameters to generate the adjusted slice parameters comprises:
    adjusting single network slice selection assistance information associated with a user equipment of the RAN.

7. The method of claim 1, wherein adjusting the DRX parameters to generate the adjusted DRX parameters comprises one or more of:
    adjusting a DRX inactivity timer associated with a user equipment of the RAN;
    adjusting a short DRX cycle associated with a user equipment of the RAN;
    adjusting a DRX short cycle timer associated with a user equipment of the RAN;
    adjusting a long DRX cycle start offset associated with a user equipment of the RAN;
    adjusting a DRX duration timer associated with a user equipment of the RAN; or
    adjusting a DRX retransmission timer associated with a user equipment of the RAN.

8. A device, comprising:
    one or more processors configured to:
        receive network data identifying a signal-to-interference-plus-noise ratio (SINR), a received signal strength indicator (RSSI), congestion, and throughput associated with a radio access network (RAN);
        receive device data identifying latency and packet loss associated with the RAN;
        receive an issue inference confidence score associated with a machine learning model of an application;

process the network data, the device data, and the issue inference confidence score, with a model, to determine whether one or more issues with the RAN are SINR/RSSI issues, network latency and throughput issues, slice latency and throughput issues, or congestion issues;

adjust transmission time interval (TTI) bundling to generate adjusted TTI bundling based on the one or more issues with the RAN being SINR/RSSI issues;

lower a quality of service (QOS) class identifier (QCI) or a QoS flow identifier (QFI) and adjust associated parameters to generate QCI/QFI adjusted parameters based on the one or more issues with the RAN being network latency and throughput issues;

adjust slice parameters to generate adjusted slice parameters based on the one or more issues with the RAN being slice latency and throughput issues; or adjust discontinuous reception (DRX) parameters to generate adjusted DRX parameters based on the one or more issues with the RAN being congestion issues;

cause the adjusted TTI bundling, the QCI/QFI adjusted parameters, the adjusted slice parameters, or the adjusted DRX parameters to be implemented by the RAN; and monitor a performance of the RAN based on causing the adjusted TTI bundling, the QCI/QFI adjusted parameters, the adjusted slice parameters, or the adjusted DRX parameters to be implemented by the RAN.

9. The device of claim 8, wherein the one or more processors, to cause the adjusted TTI bundling, the QCI/QFI adjusted parameters, the adjusted slice parameters, or the adjusted DRX parameters to be implemented by the RAN, are configured to:

cause the adjusted TTI bundling to be implemented by the RAN;

determine whether the adjusted TTI bundling reduces the SINR/RSSI issues; and further adjust the TTI bundling based on whether the adjusted TTI bundling reduces the SINR/RSSI issues.

10. The device of claim 8, wherein the one or more processors, to cause the adjusted TTI bundling, the QCI/QFI adjusted parameters, the adjusted slice parameters, or the adjusted DRX parameters to be implemented by the RAN, are configured to:

cause the QCI/QFI adjusted parameters to be implemented by the RAN;

determine whether the QCI/QFI adjusted parameters reduce the network latency and throughput issues; and further adjust the QCI/QFI parameters based on whether the QCI/QFI adjusted parameters reduce the network latency and throughput issues.

11. The device of claim 8, wherein the one or more processors, to cause the adjusted TTI bundling, the QCI/QFI adjusted parameters, the adjusted slice parameters, or the adjusted DRX parameters to be implemented by the RAN, are configured to:

cause the adjusted slice parameters to be implemented by the RAN;

determine whether the adjusted slice parameters reduce the slice latency and throughput issues; and further adjust the slice parameters based on whether the adjusted slice parameters reduce the slice latency and throughput issues.

12. The device of claim 8, wherein the one or more processors, to cause the adjusted TTI bundling, the QCI/QFI adjusted parameters, the adjusted slice parameters, or the adjusted DRX parameters to be implemented by the RAN, are configured to:

cause the adjusted DRX parameters to be implemented by the RAN;

determine whether the adjusted DRX parameters reduce the congestion issues; and further adjust the DRX parameters based on whether the adjusted DRX parameters reduce the congestion issues.

13. The device of claim 8, wherein the one or more processors, to lower the QCI or the QFI and adjust the associated parameters to generate the QCI/QFI adjusted parameters, are configured to one of:

lower the QCI, based on the RAN being associated with a fourth-generation network, and adjust the associated parameters to generate QCI adjusted parameters; or lower the QFI, based on the RAN being associated with a fifth-generation network, and adjust the associated parameters to generate QFI adjusted parameters.

14. The device of claim 8, wherein the one or more processors, to adjust the DRX parameters to generate the adjusted DRX parameters, are configured to:

adjust a connected mode DRX timer configuration associated with a user equipment of the RAN.

15. A non-transitory computer-readable medium storing a set of instructions, the set of instructions comprising:

one or more instructions that, when executed by one or more processors of a device, cause the device to:

receive network data identifying a signal-to-interference-plus-noise ratio (SINR), a received signal strength indicator (RSSI), congestion, and throughput associated with a radio access network (RAN);

receive device data identifying latency and packet loss associated with the RAN;

receive an issue inference confidence score associated with a machine learning model of an application;

process the network data, the device data, and the issue inference confidence score, with a model, to determine whether one or more issues with the RAN are SINR/RSSI issues, network latency and throughput issues, slice latency and throughput issues, or congestion issues;

adjust transmission time interval (TTI) bundling, by adjusting uplink performance of the RAN, to generate adjusted TTI bundling based on the one or more issues with the RAN being SINR/RSSI issues;

lower a quality of service (QOS) class identifier (QCI) or a QoS flow identifier (QFI) and adjust associated parameters to generate QCI/QFI adjusted parameters based on the one or more issues with the RAN being network latency and throughput issues;

adjust slice parameters to generate adjusted slice parameters based on the one or more issues with the RAN being slice latency and throughput issues; or adjust discontinuous reception (DRX) parameters to generate adjusted DRX parameters based on the one or more issues with the RAN being congestion issues; and cause the adjusted TTI bundling, the QCI/QFI adjusted parameters, the adjusted slice parameters, or the adjusted DRX parameters to be implemented by the RAN.

16. The non-transitory computer-readable medium of claim 15, wherein the one or more instructions, that cause the device to process the network data, the device data, and the issue inference confidence score, with the model, cause the device to one or more of:
  determine whether the issue inference confidence score associated with the machine learning model is less than a confidence threshold; and
  process the network data, the device data, and the issue inference confidence score, with the model, based on determining that the issue inference confidence score associated with the machine learning model is less than the confidence threshold.

17. The non-transitory computer-readable medium of claim 15, wherein the one or more instructions, that cause the device to lower the QCI or the QFI and adjust the associated parameters to generate the QCI/QFI adjusted parameters, cause the device to:
  lower the QCI or the QFI for traffic associated with a user equipment of the RAN; and
  cause the RAN to prioritize the traffic based on lowering the QCI or the QFI for the traffic.

18. The non-transitory computer-readable medium of claim 15, wherein the one or more instructions, that cause the device to adjust the slice parameters to generate the adjusted slice parameters, cause the device to:
  adjust single network slice selection assistance information associated with a user equipment of the RAN.

19. The non-transitory computer-readable medium of claim 15, wherein the one or more instructions, that cause the device to adjust the DRX parameters to generate the adjusted DRX parameters, cause the device to one or more of:
  adjust a DRX inactivity timer associated with a user equipment of the RAN;
  adjust a short DRX cycle associated with a user equipment of the RAN;
  adjust a DRX short cycle timer associated with a user equipment of the RAN;
  adjust a long DRX cycle start offset associated with a user equipment of the RAN;
  adjust a DRX duration timer associated with a user equipment of the RAN; or
  adjust a DRX retransmission timer associated with a user equipment of the RAN.

20. The non-transitory computer-readable medium of claim 15, wherein the one or more instructions, that cause the device to adjust the DRX parameters to generate the adjusted DRX parameters, cause the device to:
  adjust a connected mode DRX timer configuration associated with a user equipment of the RAN.

\* \* \* \* \*